(12) United States Patent
Garcia-Ferre et al.

(10) Patent No.: US 11,926,231 B2
(45) Date of Patent: Mar. 12, 2024

(54) ELECTRIC VEHICLE CHARGING CONNECTOR WITH ACTIVE COOLING

(71) Applicant: ABB SCHWEIZ AG, Baden (CH)

(72) Inventors: Francisco Garcia-Ferre, Baden (CH); Lilian Kaufmann, Birmenstorf (CH); Jaroslav Hemrle, Baden-Dattwil (CH); Elise Fahy, Schlieren (CH); Pedram Kheiri, Hausen (CH)

(73) Assignee: ABB E-MOBILITY B.V., Delft (NL)

( * ) Notice: Subject to any disclaimer, the term of this patent is extended or adjusted under 35 U.S.C. 154(b) by 232 days.

(21) Appl. No.: 17/531,558

(22) Filed: Nov. 19, 2021

(65) Prior Publication Data
US 2022/0153155 A1 May 19, 2022

(30) Foreign Application Priority Data
Nov. 19, 2020 (EP) .................... 20208721

(51) Int. Cl.
*B60L 53/302* (2019.01)
*B60L 53/16* (2019.01)
*H01R 13/502* (2006.01)
*H01R 13/66* (2006.01)

(52) U.S. Cl.
CPC .......... *B60L 53/302* (2019.02); *B60L 53/16* (2019.02); *H01R 13/502* (2013.01); *H01R 13/6683* (2013.01); *H01R 2201/26* (2013.01)

(58) Field of Classification Search
CPC ........ B60L 53/302; B60L 53/16; B60L 53/18; H01R 13/502; H01R 13/6683; H01R 2201/26; H05K 7/20136; H05K 7/20209; H05K 7/20318; H05K 7/20409
See application file for complete search history.

(56) References Cited

U.S. PATENT DOCUMENTS

| | | | |
|---|---|---|---|
| 2008/0115911 A1 | 5/2008 | Duesterhoeft | |
| 2019/0109409 A1* | 4/2019 | Fuehrer | H01R 13/533 |
| 2019/0322186 A1* | 10/2019 | Arai | H01B 9/00 |
| 2022/0153155 A1* | 5/2022 | Garcia-Ferre | B60L 53/18 |

FOREIGN PATENT DOCUMENTS

WO 2017/143295 A1 8/2017

OTHER PUBLICATIONS

Extended European Search Report, issued by the European Patent Office, regarding corresponding patent application Serial No. 20208721.9; dated May 18, 2021; 9 pages.

* cited by examiner

*Primary Examiner* — Abdullah A Riyami
*Assistant Examiner* — Nader J Alhawamdeh
(74) *Attorney, Agent, or Firm* — Greenberg Traurig, LLP

(57) ABSTRACT

The present invention relates to an electric vehicle charging connector (100) comprising an external enclosure (104) configured to receive and guide a cable (101) from a back (111) end to a front end (113) of the electric vehicle charging connector (100) and to enclose a compartment (102) in the front end accommodating power contacts, wherein the electric vehicle charging connector (100) further comprises an active cooling element (130).

20 Claims, 2 Drawing Sheets

ELECTRIC VEHICLE CHARGING CONNECTOR WITH ACTIVE COOLING

FIELD OF THE INVENTION

The present invention relates to an electric vehicle charging connector, a charging station, and a use of an active cooling element in an electric vehicle charging connector.

BACKGROUND

One limiting factor in charging cables for electric vehicles is the heat that is generated when high currents flow through the cable and the electrical connector from the charging station to the battery of a vehicle. The heat may be actively conducted away from the heat sources using liquids. In this way current rates over 500 A are achieved. For this kind of cooling arrangements are required that comprise and conduct the liquid from heat sinks to the heat sources and back. Additional devices such as pumps are necessary. Alternatively, passive cooling is possible. However, with existing designs only current ratings up to 200 A are achievable. Passive cooling needs a design as hollows in the enclosure or material of the enclosure the heat in the enclosure. Such designs may not be effective or lead to a high weight of the charging cable.

SUMMARY

The objective of the invention is to provide an improved thermal performance of an electric vehicle charging connector.

The problem is solved by the subject-matter of the independent claims. Embodiments are provided by the dependent claims, the following description and the accompanying figures.

The described embodiments similarly pertain to the electric vehicle charging connector, the charging station, and the use of the heat pipe in an electric vehicle charging connector. Synergetic effects may arise from different combinations of the embodiments although they might not be described in detail.

Technical terms are used by their common sense. If a specific meaning is conveyed to certain terms, definitions of terms will be given in the following in the context of which the terms are used.

According to a first aspect, an electric vehicle charging connector is provided, comprising an external enclosure that is configured to receive and guide a cable from a back end to a front end of the electric vehicle charging connector and to enclose a compartment accommodating power contacts in the front end, wherein the electric vehicle charging connector further comprises an active cooling element. That is, the active cooling element is a hardware device attached to or inside external enclosure. Under "back end" the part of the electric vehicle charging connector is understood, which is oriented to the charging station from view of a cable connection. Thus, the front end is oriented to the vehicle when plugged in. The cable coming from the charging station is received at the back end and runs through the connector up to the compartment for power contacts, which is the interface to the vehicle.

According to an embodiment, the active cooling element is a fan. In contrast to a liquid cooling, a fan is an economic and light-weighted device, that is easy to implement. No pump is needed on station side and no sophisticated interface and cable as it is the case for liquid cooling is necessary.

Nevertheless, some aspects have to be regarded that are outlined in the following embodiments. The fan may be a small fan as it is used, for example, in mobile computing devices to cool a processor or other devices. That is, a relatively simple and small fan that is readily available on the market may be used. In an example, the fan that is arranged in the external enclosure causes an air flow which may be directed or turbulent, that cools the compartment and therefore also the power contacts in the compartment.

According to an embodiment, the external enclosure further comprises a protective filter, e.g., an IP44 filter, or a protective membrane configured to supply the active cooling element such as a fan with fresh air or to blast air from the active cooling element to the environment. IP (International Protection) code 44 means protection against foreign objects and splash-proof. Requirements according to other IP classes or codes may be fulfilled. Under "protective" it is understood, that the protective filter or protective membrane is configured to protect from ingress of water and dust or similar elements.

According to an embodiment, the external enclosure further comprises additional holes configured to supply the active cooling element with fresh air or to blast air from the active cooling element to the environment. By providing holes in the external enclosure, the air flow can be guided to some degree, such that the air is not accumulated or depleted in the external enclosure. The active cooling element such as a fan may be operated either such that the air flow is directed from the filter to the holes or vice versa. The size of the holes may result from a compromise between protection and thermal performance.

According to an embodiment, the electric vehicle charging connector further comprises an inner enclosure, wherein the external enclosure encloses the inner enclosure and the inner enclosure encloses the compartment for the power contacts. The inner enclosure may be sealed with respect at least to the external enclosure and provide a high degree of protection of the compartment and power contacts.

According to an embodiment, the electric vehicle charging connector further comprises a heat pipe. The heat pipe is a passive cooling element that may be used in addition to the active cooling element. The combination of heat pipe and fan is highly efficient. The heat pipe may be a twin heat pipe with two evaporators and tubes to magnify the absorption of the heat when attached at different location of cable inside the inner enclosure, e.g., the power contacts. Further, the electric vehicle charging connector may comprise several heat pipes, e.g., one for each phase in case of an AC-charging connector.

According to an embodiment, the heat pipe comprises an evaporator arranged inside the inner enclosure, a condenser arranged in a free space inside the external enclosure and outside the internal enclosure, and a thermal bridge element connecting the evaporator with the condenser. Further, also the cooling element is arranged in the free space inside the external enclosure. Under "thermal bridge element" the tube or part of the heat pipe is understood that guides the vapor from the evaporator to the condenser. Thus, by using a heat pipe the heat from the compartment can be conducted to a location where the air flow fan is most effective. Especially, when the air flow passes the fins of the condenser, the surface area that can be cooled is great. Further, when having a sealed inner enclosure, the heat can be conducted through the sealing point out of the inner enclosure, maintaining the sealing and the high IP protection level inside the inner enclosure. By using a heat pipe the heat from the compartment can be conducted to a location where the air flow fan is most effective. Especially, when the air flow passes the fins of the condenser, the surface area that can be cooled is great. Further, when having a sealed inner enclosure, the heat can be conducted through the sealing point out of the inner enclosure, maintaining the sealing and the high IP protection level inside the inner enclosure.

According to an embodiment, the external outer enclosure comprises an inner structure configured to guide the air flow such that it passes elements to be cooled. The elements to be cooled may be the condenser, the compartment and/or the power contact. The structure may be designed such that it takes into account the ambient air inlets and outlets to the environment such as a filter, membrane and holes for guiding the air flow.

According to an embodiment, the electric vehicle charging connector comprises a control unit and a temperature sensor, wherein the control unit is configured to control the cooling element according to a temperature measured by the temperature sensor. The cooling element may be supplied for example by a low voltage connection to the charging station. Thus, the active cooling element or fan may be controllable. For that, the electric vehicle charging connector may further comprise, for instance, itself a control circuit and a temperature sensor. For example, the fan may be activated not before reaching a pre-defined threshold of a temperature inside the external enclosure, or the speed of rotation may be adapted corresponding to the temperature. This may allow for using a smaller cooling device, which may be driven at necessary speed only, and only if necessary at maximum speed. Further, a warning may be given or measure may be taken such as reducing or stopping the power transfer to the vehicle if the temperature is getting too high. A controlled speed may furthermore extend the life cycle of the fan.

According to a further aspect, a charging station is provided, comprising an electric vehicle charging connector as described herein.

According to an embodiment, the charging station further comprises an interface providing low voltage energy to the electric vehicle charging connector.

According to a further aspect a use of an active cooling element in an electric vehicle charging connector as described herein is provided.

These and other features, aspects and advantages of the present invention will become better understood with reference to the accompanying figure and the following description. Identical or equivalent elements are in principle provided with the same reference signs.

SHORT DESCRIPTION OF THE FIGURES

DETAILED DESCRIPTION OF EMBODIMENTS

Figure 1:
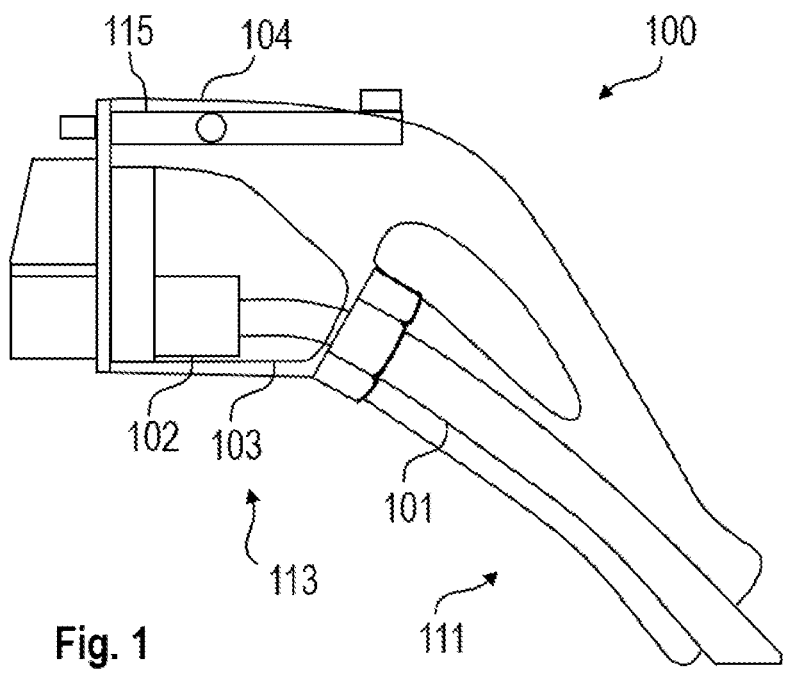
FIG. 1 shows a diagram of the electric vehicle charging connector.

FIG. 1 shows the main features of the design. The charging connector an external enclosure 104 configured to receive and guide a cable 101 from a back end 111 to a front end 113 of the electric vehicle charging connector 100 and to enclose a compartment 102 or contact holder 102 in the front end 113 accommodating power contacts. The cable 101 is linked to a compartment or contact holder 102 in the front end 113 inside of an internal casing 103. The function of the internal casing 103 is to ensure electrical insulation, mechanical strength, prevent water and dirt contamination. For this reason, casing 103 is massively sealed, and in some designs also nearly completely potted structure. Also the contact holder 102 can be treated in this way. The combination of components 102 and 103 is further enclosed in external enclosure 104. The connector 100 may contain an additional "latch element" 115. This element 115 is a lever used to lock the connector to the car, and facilitate the communication between car and charging post so that the charging session can begin.

The purpose of the overall design is to have a triple mechanical protection of the contacts, guaranteed by the contact holder 102, the internal enclosure 103 and the external enclosure 104, and a double IP (International Protection, Ingress Protection) protection, guaranteed by the contact holder 102 and the internal casing 103. Another reason for separating casing 103 and 104 is weight. The severe functional requirements on internal casing 103 lead to fairly robust and heavy design, that is also potentially "sealed for life". On the other hand, the bulkier external casing 104 is built in fairly light manner, with focus on weight reduction and comfort.

Figure 2:
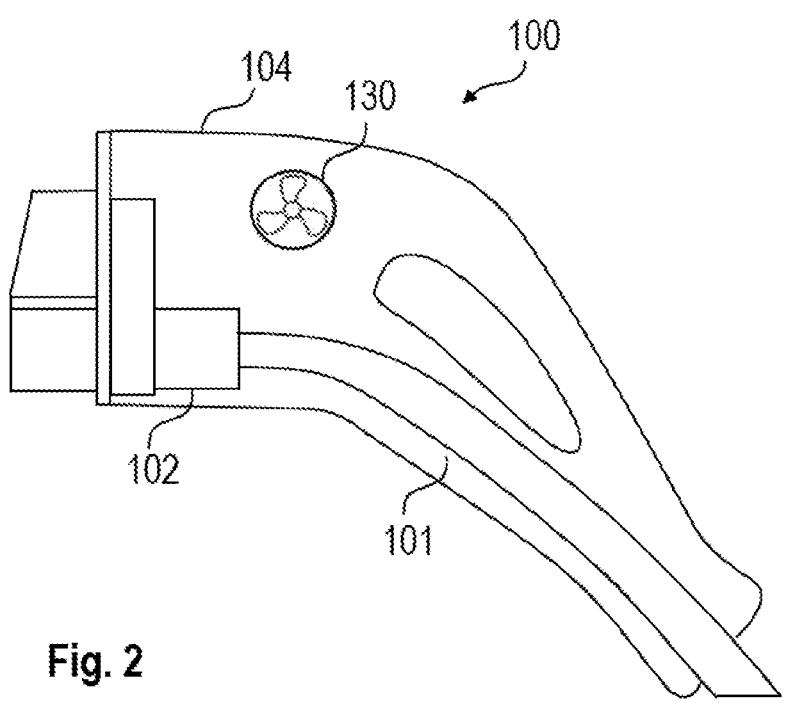
FIG. 2 shows a diagram of the electric vehicle charging connector of FIG. 1 comprising additionally a fan.

FIG. 2. shows connector 100 with cable 101 containing the Cu-conductors for the power contacts, the ground and the signal contacts. The connector 100 further comprises compartment 102. i.e. holder for the power contacts, the enclosure 104 and an active cooling system 130. In this example of a design, there is no inner enclosure. The active cooling system 130 may be a simple fan, such as the small fans utilized to cool laptops and other electronic components. The overall system is designed in such a way that in can pass IP44 water and dust ingress protection tests, meaning that the fan is rated at least IP44. This can be achieved, for example by the use of proper filters, protecting the fan from the external environment. The cooling system 130 may include one or more of these fans 130 and, ideally, it allows to flow fresh air directly onto the power contacts, which are held in the contact compartment 102. The enclosure 104 is designed in such a way that it exposes the fan 130 directly to the external environment. The only barrier between the fan 130 and the environment being the IP44 filter or membrane. In this way, efficient flow of fresh air is enabled. This is also achieved by including one or more small openings in different locations. Thus fresh air can enter the connector through those openings and exit through the fan opening. The external enclosure 104 can be designed in the exact opposite manner: the fresh air enters through the fan 130 and exits through the small openings. Ideally, the enclosure also has features directing the fresh air towards the power contacts in the contact holder or compartment 102, but this is not always necessary. Indeed, if the enclosure 104 and the contact compartment 102 are open enough, proper turbulent air flow may be guaranteed without need for directing air to the contacts by means of any particular feature.

Figure 3:
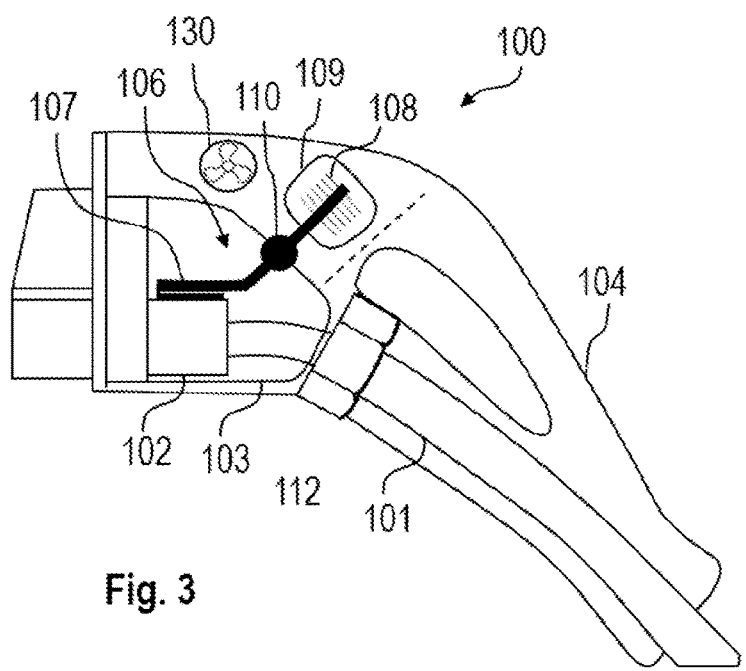
FIG. 3 shows a diagram with a combination of the arrangements shown in FIGS. 1 and 2.

FIG. 3 shows an example where the charging connector 100 comprises both, a fan 130 and a heat pipe 106 with a evaporator 107, a thermal heat bridge 112 and a condenser 109 with fins 108. The evaporator may be thermally connected to the cable or to the power contacts inside the compartment. The heat pipe transports the heat generated in the compartment 102 in the inner enclosure 103 via the thermal bridge 112 to the condenser 109 in the external enclosure, thereby passing the sealing point 110. The air flow from the fan may be directed towards the fins of the heat pipe enabling a highly efficient cooling.

Figure 4:
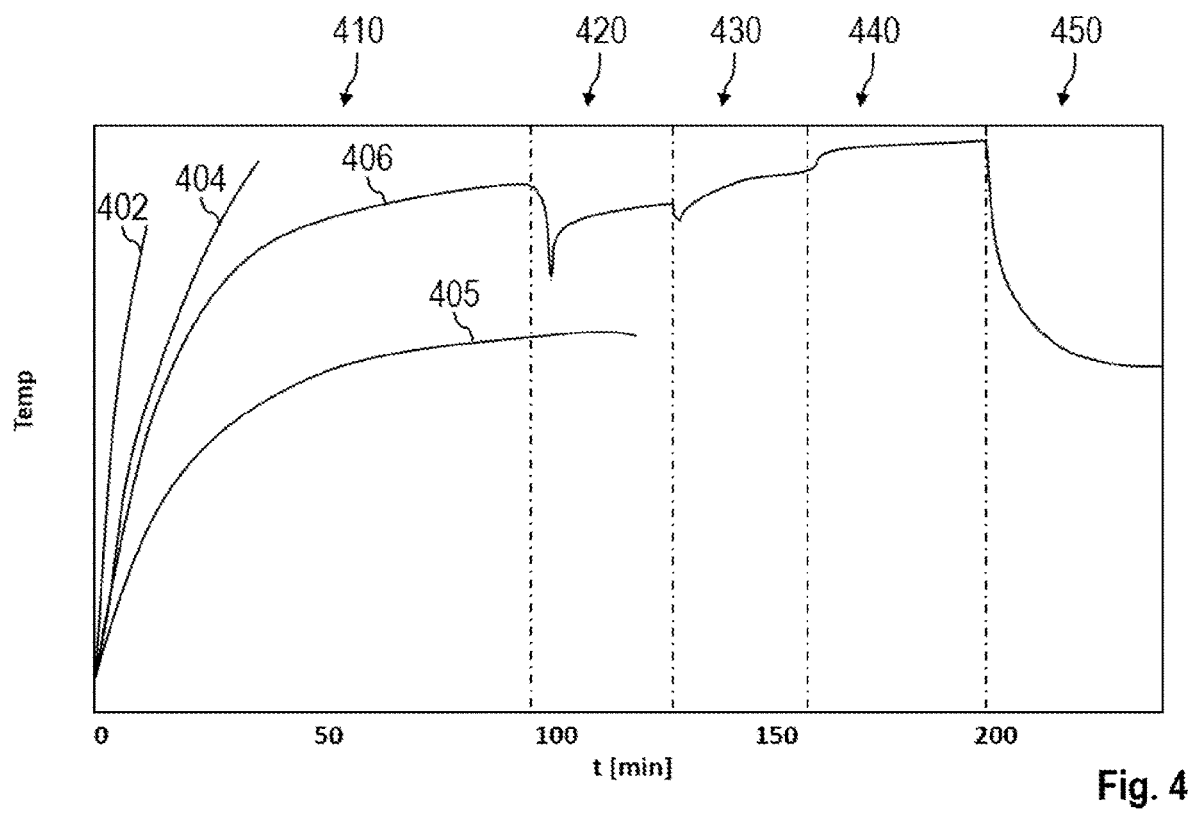
FIG. 4 shows a diagram of the thermal performance.

Experimental evidence of the benefit of adding a fan to a connector, in terms of thermal performance, is shown in FIG. 4. The figure shows a graph with the temperature of the power contacts as a function of time, measured for a benchmark supplier with a car socket having conductors of either 70 mm$^2$ (curve 404) or 120 mm$^2$ (curve 405), and for a charging connector as presented in this disclosure. The charging connector includes the features such as internal enclosure bridged by heat pipe and condenser. The charging connector was only measured with the 70 mm$^2$ car socket, which represents a more conservative scenario, under changing conditions. At first, the connector was tested without heat pipes resulting in curve 402. Then the heat pipes were added resulting in curve 406. In the beginning (section 410), no external enclosure was used. In section 420, the system was turned off and after some minutes on again, and has no further meaning. Then, in sections 430, 440, and 450, the external enclosure of the charging connector was added. The curve in section 430 shows the temperature with covered holes in the external enclosure, allowing for natural convection.

Then, these holes were closed, leading to a degradation of thermal performance as shown for section 440. Lastly, in section 450, a fan was added leading to the best thermal performance of the compared configurations, demonstrating that the use of a fan can bring huge benefits. It is worth noting that the starting point, that is, a connector without heat pipe, is worse than the benchmark supplier, i.e., the temperatures at the contacts were higher, which can be explained by the fact that the contacts are very well insulated thermally and mechanically. This proves, that the connector in the basic configuration, and therefore also in the further configurations is a very safe connector. By implementing the cooling system as described with a heat pipe or a heat pipe and additionally holes in the enclosure, the thermal performance becomes better than the benchmark (using the same 70 mm$^2$ car inlet; curve 404). Moreover, if also the fan is implemented, then the thermal performance is even better than the benchmark with the larger car inlet (curve 405) while the charging connector with the fan is measured with the smaller car inlet (curve 406, section 450).

According to another example, a charging station is connected to a vehicle via an electric vehicle charging connector. The connection of the electric vehicle charging connector to the charging station is fixed, so that the electric vehicle charging connector is part of the charging station.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An electric vehicle charging connector comprising:
an external enclosure configured to receive and guide a cable from a back end to a front end of the electric vehicle charging connector and to enclose a compartment in the front end accommodating power contacts; wherein the electric vehicle charging connector further comprises an active cooling element;
wherein the external enclosure further comprises a protective filter or a protective membrane configured to protect from an external environment.

2. The electric vehicle charging connector according to claim 1, wherein the active cooling element is a fan.

3. The electric vehicle charging connector according to claim 1, wherein the protective filter or the protective membrane is configured to supply the active cooling element with fresh air or to blast air from the active cooling element to the external environment.

4. The electric vehicle charging connector according to claim 3, wherein the external enclosure further comprises additional holes configured to supply the active cooling element with fresh air or to blast air from the active cooling element through the additional holes to the external environment.

5. The electric vehicle charging connector according to claim 1, wherein the electric vehicle charging connector further comprises an inner enclosure, wherein the external enclosure encloses the inner enclosure and the inner enclosure encloses the compartment for the power contacts.

6. The electric vehicle charging connector according to claim 5, wherein the electric vehicle charging connector further comprises a heat pipe.

7. The electric vehicle charging connector according to claim 6, wherein the heat pipe comprises an evaporator arranged inside the inner enclosure, a condenser arranged in a free space inside the external enclosure and outside the inner enclosure, and a thermal bridge element connecting the evaporator with the condenser; and
wherein the active cooling element is arranged in the free space inside the external enclosure.

8. The electric vehicle charging connector according to claim 1, wherein the external enclosure comprises an inner structure configured to guide air flow such that it passes elements to be cooled.

9. The electric vehicle charging connector according to claim 1, comprising a control unit and a temperature sensor, wherein the control unit is configured to control the active cooling element according to a temperature measured by the temperature sensor.

10. A charging station comprising an electric vehicle charging connector according to claim 1.

11. A charging station according to claim 10, further comprising a low voltage interface providing low voltage energy to the electric vehicle charging connector.

12. A method of using a fan in an electric vehicle charging connector according to claim 1.

13. The electric vehicle charging connector according to claim 2, wherein the external enclosure further comprises a protective filter or a protective membrane configured to supply the active cooling element with fresh air or to blast air from the active cooling element to the external environment.

14. The electric vehicle charging connector according to claim 13, wherein the external enclosure further comprises additional holes configured to supply the active cooling element with fresh air or to blast air from the active cooling element through holes to the external environment.

15. The electric vehicle charging connector according to claim 2, wherein the electric vehicle charging connector further comprises an inner enclosure, wherein the external enclosure encloses the inner enclosure and the inner enclosure encloses the compartment for the power contacts.

16. The electric vehicle charging connector according to claim 2, wherein the electric vehicle charging connector further comprises a heat pipe.

17. The electric vehicle charging connector according to claim 16,
wherein the heat pipe comprises an evaporator arranged inside an inner enclosure, a condenser arranged in a free space inside the external enclosure and outside the inner enclosure, and a thermal bridge element connecting the evaporator with the condenser; and
wherein the active cooling element is arranged in the free space inside the external enclosure.

18. The electric vehicle charging connector according to claim 2, wherein the external enclosure comprises an inner structure configured to guide the air flow such that it passes elements to be cooled.

19. The electric vehicle charging connector according to claim 2, comprising a control unit and a temperature sensor, wherein the control unit is configured to control the cooling element according to a temperature measured by the temperature sensor.

20. A charging station comprising an electric vehicle charging connector according to claim 2.

\* \* \* \* \*